US011598851B2

(12) United States Patent
Shi et al.

(10) Patent No.: US 11,598,851 B2
(45) Date of Patent: Mar. 7, 2023

(54) OPTICAL DETECTING ASSEMBLY, DETECTOR AND LASER RANGING SYSTEM

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 643 days.

(21) Appl. No.: 16/609,204

(22) PCT Filed: Jul. 25, 2018

(86) PCT No.: PCT/CN2018/096943
§ 371 (c)(1),
(2) Date: Oct. 28, 2019

(87) PCT Pub. No.: WO2019/024728
PCT Pub. Date: Feb. 7, 2019

(65) Prior Publication Data
US 2020/0064449 A1   Feb. 27, 2020

(30) Foreign Application Priority Data
Aug. 4, 2017 (CN) .......................... 201710661927.3

(51) Int. Cl.
*G01S 7/48* (2006.01)
*G01S 17/08* (2006.01)
*G01S 7/481* (2006.01)

(52) U.S. Cl.
CPC .......... *G01S 7/4816* (2013.01); *G01S 7/4808* (2013.01); *G01S 17/08* (2013.01)

(58) Field of Classification Search
CPC ...... G01S 7/4816; G01S 7/4808; G01S 17/08; G01S 1/70; G01S 1/703; G01S 11/12; G01J 1/0411; G01J 1/0414; G01J 1/42
See application file for complete search history.

(56) References Cited

U.S. PATENT DOCUMENTS 4,334,781 A   6/1982 Ozeki
5,243,397 A * 9/1993 Friedland ................ G01S 11/12
                                                    342/450
(Continued)

FOREIGN PATENT DOCUMENTS

CN       1603868 A    4/2005
CN     101206113 A    6/2008
(Continued)

OTHER PUBLICATIONS

World Intellectual Property Organization (WIPO) International Search Report for PCT/CN2018/096943 dated Oct. 25, 2018 6 pages.
(Continued)

*Primary Examiner* — Seung C Sohn
(74) *Attorney, Agent, or Firm* — Anova Law Group, PLLC (57) ABSTRACT

An optical detecting assembly includes: a photosensitive element configured to receive an optical signal and convert it into an electrical signal; and a light guide member comprising a first portion for receiving a first light beam from a rotating light source at a first time point and guiding the first light beam to the photosensitive element and a second portion for receiving a second light beam from the rotating light source at a second time point and guiding the second light beam to the photosensitive element. A distance between the optical detecting assembly and the rotating light source is calculated based on a distance between the first portion and the second portion, a time difference between the first time point and the second time point, and a rotating speed of the rotating light source.

16 Claims, 4 Drawing Sheets

(56) References Cited

U.S. PATENT DOCUMENTS

| | | | |
|---|---|---|---|
| 7,110,092 B2* | 9/2006 | Kasper | G01S 11/12 356/5.01 |
| 9,031,641 B2* | 5/2015 | Rajan | A61B 5/0024 600/479 |
| 9,423,298 B2 | 8/2016 | Gu et al. | |
| 11,119,202 B2* | 9/2021 | Shi | G01S 7/4816 |
| 2002/0051288 A1* | 5/2002 | Shirai | G01S 7/4812 359/399 |
| 2008/0143999 A1* | 6/2008 | Wen-Yu | G01S 11/12 356/5.01 |
| 2010/0321669 A1* | 12/2010 | Yamada | G01C 15/002 356/4.01 |
| 2014/0043597 A1 | 2/2014 | Goering | |

FOREIGN PATENT DOCUMENTS

| | | |
|---|---|---|
| CN | 103576133 A | 2/2014 |
| CN | 107290049 A | 10/2017 |
| CN | 207081481 U | 3/2018 |
| GB | 2406905 A | 4/2005 |

OTHER PUBLICATIONS

European Paten Office Supplementary European Search Report for Application No. 18841647.3 dated Mar. 15, 2021, 10 pages.

\* cited by examiner

OPTICAL DETECTING ASSEMBLY, DETECTOR AND LASER RANGING SYSTEM

This application is a National Stage entry under § 371 of International Application No. PCT/CN2018/096943, filed on Jul. 25, 2018, and claims priority to Chinese Patent Application No. CN201710661927.3, filed on Aug. 4, 2017, the entire contents of which are hereby incorporated as reference.

FIELD OF THE DISCLOSURE

The present invention relates to the field of distance measuring and positioning, and more particularly to an optical detecting assembly, a detector including the optical detecting assembly and for use with a laser emitting apparatus, and a laser ranging system including the detector.

BACKGROUND

In the prior art, the published patent literature CN101206113A discloses a rangefinder and a ranging method thereof. The rangefinder disclosed in the patent provides a light beam having a predetermined rotating speed by a rotating light source, and then detects the time between the time point at which the light beam is received by a receiver at a first position of the receiver and the time point at which the light beam is received by the receiver at a second position of the receiver, and calculates the distance from the receiver to the rotating light source based on the detected time and the distance between the first position and the second position of the receiver. The above rangefinder and the ranging method can easily implement the function of distance measurement in the laser level, thereby improving the construction convenience of engineering personnel.

Figure 1:
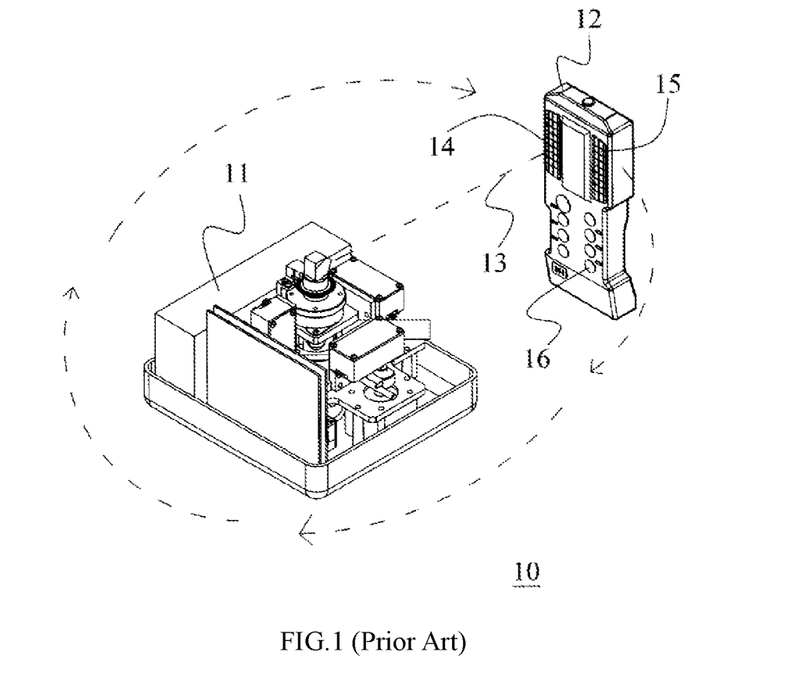
FIG. 1 illustrates a schematic diagram of a rangefinder 10 according to the prior art.

Specifically, referring to FIG. 1, FIG. 1 illustrates a schematic diagram of a rangefinder according to the disclosure of the patent. In FIG. 1, in order to improve the profitability of the construction of engineering personnel, the rangefinder 10 is constructed on the uniaxial rotating laser level 11 and its receiver 12, so that the uniaxial rotating laser level 11 can not only provide an automatically flattened rotating laser beam 13 to project a horizontal reference line on the construction wall, but also assist the engineering personnel in measuring the distance required for the construction marking. The receiver 12 may further include a remote control circuit 16 for remotely controlling the operation of the uniaxial rotating laser level 11 such as a rotating speed, to become a remoter for remotely controlling the uniaxial rotating laser level 11. In FIG. 1, in addition to the rotating light source constructed using the uniaxial rotary laser level 11 without providing the laser beam 13 rotating at a predetermined rotating speed, the receiver 12 is further applied to detect a time between the time point at which the light beam is received by a receiver 12 at a first position 14 of the receiver 12 and the time point at which the light beam is received by the receiver 12 at a second position 15 of the receiver, so as to calculate the distance from the receiver 12 to the uniaxial rotating laser level 11 based on the time and the distance between the first position 14 and the second position 15 of the receiver.

From the above discussion, the detector assembly includes an independent first receiving circuit and an independent second receiving circuit, and the first receiving circuit and the second receiving circuit respectively include: an optical sensor for receiving the light beam and outputting a current signal; the converting circuit connected to the optical sensor for converting the current signal into a voltage signal; an amplifying circuit coupled to the converting circuit for amplifying the voltage signal, and a comparator connected to the amplifying circuit for comparing the amplified voltage signal with a reference level, and outputting a voltage signal which represents the detected light beam.

In this way, each detector assembly must include at least two sets of optical sensors, converting circuits, amplifying circuits, and comparators. Such detector assemblies are expensive to manufacture and complex in structure.

SUMMARY

In view of the above technical problem, each detector component in the prior art must include at least two sets of optical sensors, converting circuits, amplifying circuits, and comparators, such that such detector assembly is constructed costly and the structure thereof is complicate. A first aspect of the present invention provides an optical detecting assembly, the optical detecting assembly comprising:

a photosensitive element configured to receive an optical signal and convert it into an electrical signal; and a light guide member comprising a first portion for receiving a light beam and guiding the light beam to the photosensitive element and a second portion for receiving the light beam and guiding the light beam to the photosensitive element.

The optical detecting assembly in accordance with the present invention can implement the process of optical signals at different positions using only one set of photosensitive members by providing the light guide member, thereby advantageously simplifying the structure of the optical detecting assembly in the prior art, and correspondingly reducing the manufacturing cost of the optical detecting assembly in the prior art.

In one embodiment of the present invention, the optical detecting assembly further comprising:

a signal processing module configured to process the electrical signal.

In one embodiment of the present invention, the optical detecting assembly further comprising:

an amplifying circuit coupled between the photosensitive element and the signal processing module and configured to amplify the electrical signal originating from the photosensitive element and output it to the signal processing module.

In one embodiment of the present invention, the optical detecting assembly further comprising:

a filter circuit coupled between the photosensitive element and the signal processing module and configured to filter the electrical signal originating from the photosensitive element.

In one embodiment of the present invention, the first portion and the second portion are configured to be located at two positions opposite to each other on the light guide member.

In one embodiment of the present invention, the first portion is configured to receive the light beam first and guide the light beam to a portion of the photosensitive element, the second portion is configured to receive the light beam last and guide the light beam to the photosensitive element.

In one embodiment of the present invention, the distance between the first portion and the second portion is set to a first distance.

In one embodiment of the present invention, the photosensitive element is configured as a photoelectric sensing device. And, the photoelectric sensing device comprises a charge coupled device (CCD), an avalanche photodiode (APD), a silicon photocell or a solar cell.

In one embodiment of the present invention, the optical detecting assembly further comprising a timing module configured to calculate the time during which the light beam is sensed respectively by the first portion and the second portion.

In one embodiment of the present invention, the light guide member is configured as a spherical mirror, a free-form mirror, an aspheric mirror, a light guide bar, a light guide surface, a plane mirror, a guide light rod, a fiber or a reflecting mirror.

Further, a second aspect of the present invention provides a detector for use with a laser emitting apparatus, the detector comprising the optical detecting assembly according to the first aspect of the present invention. And, the number of the optical detecting assemblies is at least two sets, and the at least two sets of optical detecting assemblies are circumferentially arranged.

Furthermore, a third aspect of the present invention provides a laser ranging system comprising a laser emitting apparatus and a detector according to the second aspect of the present invention.

Finally, a fourth aspect of the present invention provides a laser ranging method, the method comprising:

disposing an optical detecting assembly according to claim 1 or an optical detecting assembly included in a detector according to claim 11 vertically;

calculating a distance between the optical detecting assembly and a laser emitting apparatus emitting a laser based on the time during which the laser rotating at a first rotating speed passes through two positions on the optical detecting assembly spaced apart a first distance from each other, the first rotating speed, and the first distance.

In one embodiment of the present invention, the method further comprising:

dividing the photosensitive elements of the optical detecting assembly into a first sub-group located on the upper half and a second sub-group located on the lower half; and adjusting the position of the optical detecting assembly according to the energy distribution of the laser rotating at the first rotating speed on the first sub-group and the second sub-group to determine a horizontal plane indicated by the laser rotating at the first rotating speed.

The optical detecting assembly in accordance with the present invention can implement the process of optical signals at different positions by providing the light guide member, thereby advantageously simplifying the structure of the optical detecting assembly in the prior art, and correspondingly reducing the manufacturing cost of the optical detecting assembly in the prior art.

BRIEF DESCRIPTION OF THE DRAWINGS

Embodiments are shown and described with reference to the drawings. These drawings are used to clarify the basic principles and thus only show the necessary aspects for understanding the basic principles. These drawings are not drawn to scale. In the drawings, identical reference numerals indicate identical features.

Other features, characteristics, advantages and benefits of the present invention will become more apparent from the detailed description of the appended claims.

DETAILED DESCRIPTION

The detailed description of the following preferred embodiments will be described below with reference to the drawings. By way of example, the accompanying drawings illustrate specific embodiments which can implement the present invention. The exemplary embodiments are not intended to be exhaustive of all embodiments in accordance with the invention. It will be understood that other embodiments may be utilized and structural or logical modifications may be made without departing from the scope of the invention. Therefore, the following detailed description is not to be considered as limited, and the scope of the invention is defined by the appended claims.

The applicant of the present application wishes to clarify that the terms "horizontal disposing" and "vertical disposing" as used in the context of the present application refer to the arrangement of the photosensitive elements contained in the laser receiving apparatus, wherein the term "vertical disposing" means that a photosensitive member such as a strip included in the laser receiving apparatus is disposed substantially perpendicular to a horizontal plane, and the term "horizontal disposing" means that a photosensitive member such as a strip included in the laser receiving apparatus is disposed substantially on the same horizontal plane.

Figure 2:
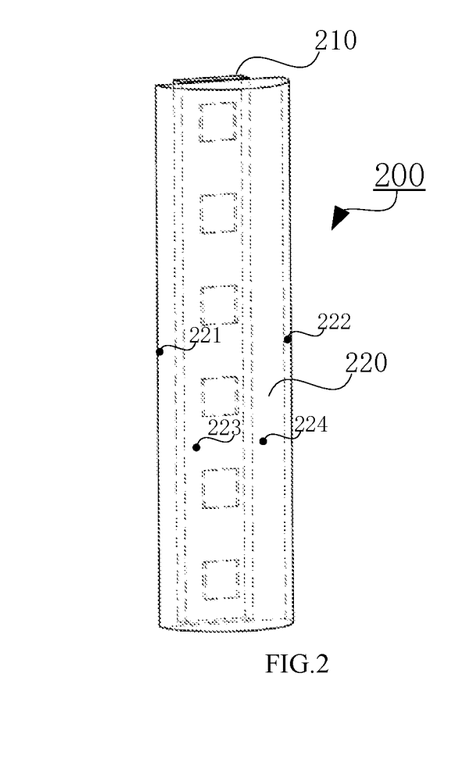
FIG. 2 illustrates a schematic diagram of an optical detecting assembly 200 according to an embodiment of the present invention.
Figure 3:
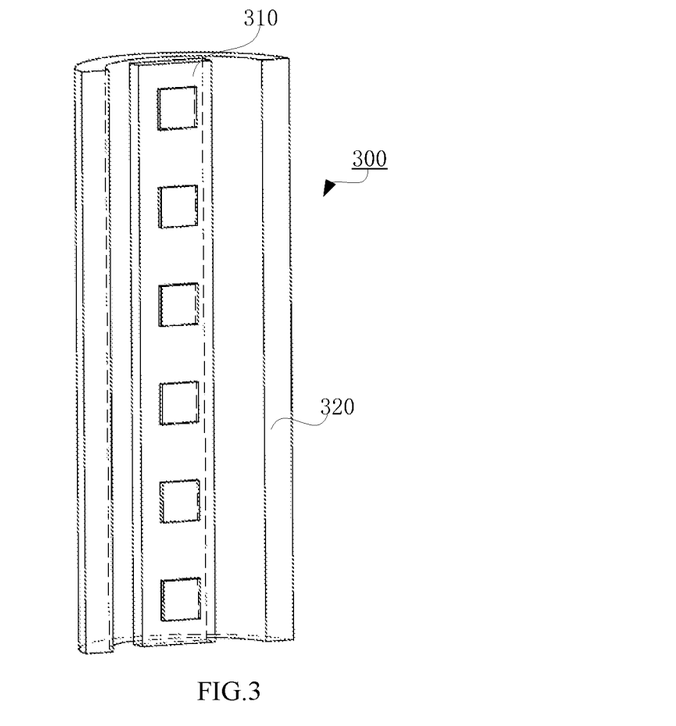
FIG. 3 illustrates a schematic diagram of an optical detecting assembly 300 according to another embodiment of the present invention.
Figure 4:
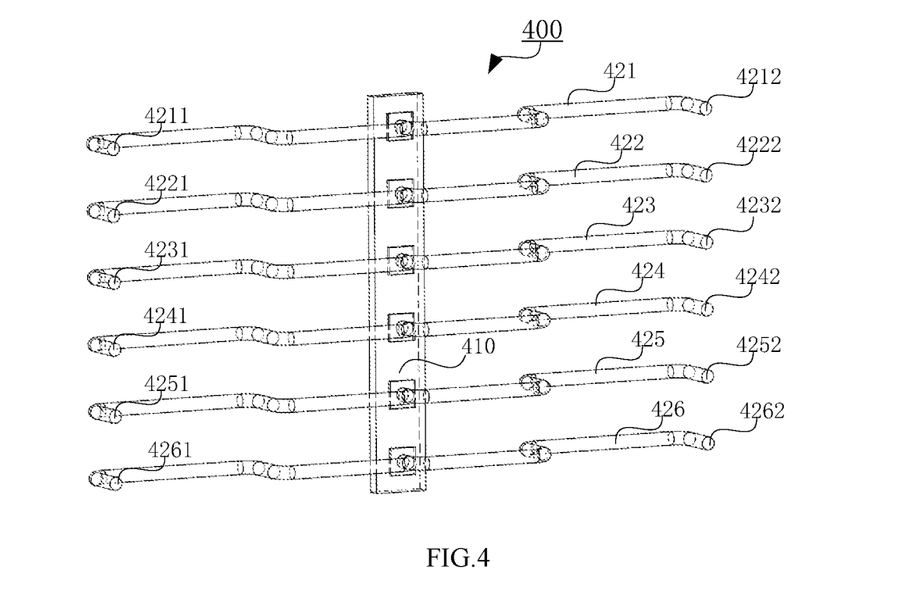
FIG. 4 illustrates a schematic diagram of an optical detecting assembly 400 according to yet another embodiment of the present invention.

With the respect to a technical problem that each detector assembly in FIG. 1 must include at least two sets of optical sensors, converting circuits, amplifying circuits, and comparators to make such detector assembly costly to manufacture and complicated in structure, the present invention proposes a structure of a novel optical detecting assembly, such as shown in FIGS. 2 to 4, each embodiment of the optical detecting assembly disclosed in accordance with the present invention will be separately described below with reference to FIGS. 2 to 4, it should be understood by one skilled person that the embodiments of FIGS. 2 to 4 are merely exemplary and not limiting, and show merely exemplarily a possible structure of the optical detecting assembly in accordance with the present invention, but are not intended to be exhaustive of all the possible structures in accordance with the present invention, and one skilled person is able to make modifications to these embodiments without departing from the concept of the invention based on the technique, and the modified variants are still within the scope of the present invention.

As can be seen from FIG. 2, the optical detecting assembly 200 in accordance with the present invention includes a photosensitive element 210 configured to receive an optical signal and convert it into an electrical signal; further, the mentioned optical detecting assembly 200 in accordance with the present invention includes a light guide member 220 that includes first portions 221, 223 for receiving a light beam and guiding the light beam to the photosensitive element 210 and second portions 222, 224 for receiving a light beam and guiding the light beam to the photosensitive element 210. It can be seen from the above structure that the optical detecting assembly in accordance with the present invention, which is provided with a light guide member 220, can implement the processing of optical signals at different positions 221, 222, 223 and 224 by using only one set of photosensitive element 210, thereby advantageously simplifying the structure of the optical detecting assembly in the prior art and correspondingly reducing the manufacturing cost of the optical detecting assembly in the prior art.

The present invention utilizes the optical characteristics of the light guide member 220 that is capable of guiding the received light beam to the photosensitive element 210 associated therewith, thereby enabling the photosensitive element 210 to convert the optical signal into an electrical signal for subsequent processing.

Figure 7:
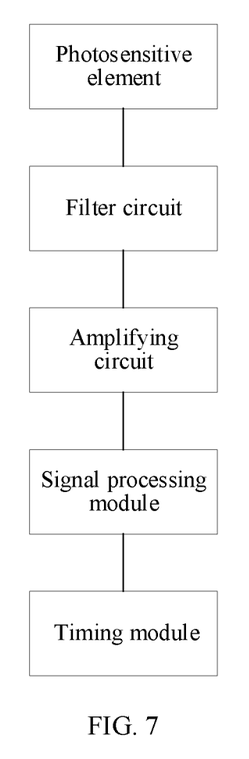
FIG. 7 illustrates a structural diagram of an optical detecting assembly according to an embodiment of the present invention.

In order to process the electrical signal generated by the photosensitive element 210, in one embodiment in accordance with the invention, as shown in FIG. 7, the optical detecting assembly further includes a signal processing module configured to process the electrical signal. For example, the signal processing module can perform operations such as analog-to-digital conversion on the electrical signal to improve the transmitability and immunity of the electrical signal.

In addition, in order to further improve the processing precision of the electrical signal, in one embodiment in accordance with the present invention, the optical detecting assembly may further include an amplifying circuit coupled between the photosensitive element and the signal processing module and configured to amplify and output the electrical signals originating from the photosensitive element to the signal processing module.

Furthermore, in order to improve the anti-interference of the electrical signal in the optical detecting assembly according to the present invention, in one embodiment according to the present invention, the optical detecting assembly may further comprise a filter circuit coupled between the photosensitive element and the signal processing module and configured to filter the electrical signal originating from the photosensitive element. Those skilled in the art will appreciate that the filter circuit herein can filter when the electrical signal is being processed, in order to improve the immunity of the electrical signal in the optical detecting assembly mentioned in accordance with the present invention. Of course, those skilled in the art will be also conceivable to use optical filters to filter out stray light or solar interference, thereby improving the immunity of the electrical signal in the optical detecting assembly mentioned in accordance with the present invention.

In one embodiment in accordance with the present invention, the light guide member 220 is a cylindrical lens, and other aspherical lenses can also be applied in the present embodiment. The first portion and the second portion are configured to be located at two positions opposite to each other on the light guide member. As shown in FIG. 2, the light guide member 220 includes first portions 223, 221 for receiving a light beam and guiding the light beam to the photosensitive element 210, and second portions 224, 222 for receiving a light beam and guiding the light beam to the photosensitive element 210. In this embodiment, the first portion 223 for receiving the light beam and guiding the light beam to the photosensitive element 210 and the second portion 224 for receiving the light beam and guiding the light beam to the photosensitive element 210 form a pair of measurement points, while the first portion 221 for receiving the light beam and guiding the light beam to the photosensitive element 210 and the second portion 222 for receiving the light beam and guiding the light beam to the photosensitive element 210 form another pair of measurement points. Of course, those skilled in the art should understand that the first portion 223 for receiving the light beam and guiding the light beam to the photosensitive element 210 and the second portion 222 for receiving the light beam and guiding the light beam to the photosensitive element 210 can form a pair of measurement points. Accordingly, the first portion 221 for receiving the light beam and guiding the light beam to the photosensitive element 210 and the second portion 224 for receiving the light beam and guiding the light beam to the photosensitive element 210 can form another pair of measurement points. At each time of measurement, the laser beam will pass through each part of a pair of measurement points. The location setting of the above two pairs of measurement points is merely illustrative and not limiting, and those skilled in the art will appreciate that the first portions 223, 221 and the second portions 224, 222 can be disposed on any suitable location of the light guide member, as long as the pair of measurement points can receive the laser beam and guide it to the photosensitive element when the laser beam passes through the light guide member.

In one preferred embodiment in accordance with the invention, the first portion is configured to receive the light beam first and guide the light beam to a portion of the photosensitive element, while the second portion is configured to receive the light beam last and guide the light beam to a portion of the photosensitive element. In the embodiment shown in FIG. 2, the portion that receives the light beam and guides the light beam to the photosensitive element is, for example, the first portion 221 for receiving the light beam and guiding the light beam to the photosensitive element 210, and the portion that receives the light beam last and guides the light beam to the photosensitive element is, for example, the second portion 222 for receiving the light beam and guiding the light beam to the photosensitive element 210. In such a manner, the measurement can be taken over the longest distance, i.e. the longest measurement time, so as to reduce errors and improve measurement accuracy. In one embodiment in accordance with the present invention, the photosensitive element described above is constructed as a photoelectric sensing device. The photoelectric sensing device can be a charge coupled device (CCD), an avalanche photodiode (APD), a silicon photocell, or a solar cell.

In one embodiment in accordance with the invention, the distance between the first portion and the second portion is set to a first distance. In one embodiment in accordance with the invention, the optical detecting assembly further includes a timing module configured to calculate the time during which the light beam is sensed respectively by the first portion and the second portion of the light guide member. At this time, in the case of knowing the laser scanning speed of the emitting laser module and the time of the laser passing through the first portion and the second portion, the distance between the emitting laser module and the optical detecting assembly can be calculated based on the first distance.

FIG. 3 illustrates a schematic diagram of another embodiment 300 of an optical detecting assembly in accordance with the present invention. The optical detecting assembly 300 in accordance with the present invention includes a photosensitive element 310 configured to receive an optical signal and convert it into an electrical signal. Further, the optical detecting assembly 300 in accordance with the present invention includes a light guide member 320, the light guide member includes a first portion for receiving a light beam and guiding the light beam to the photosensitive element 310 and a second portion for receiving a light beam and guiding the light beam to the photosensitive element 310. As can be seen from the figure, the difference between the optical detecting assembly 300 according to the embodiment shown in FIG. 3 and the optical detecting assembly 200 according to the embodiment shown in FIG. 2 is that the structure and shape of the light guide member 320 included in the optical detecting assembly 300 are different from that of the light guide member 220 included in the optical detecting assembly 200 thereof. In particular, the light guide member 220 in FIG. 2 is a semi-cylindrical lens, and the light beam transmits through the cylindrical lens to be refracted and guided to the photosensitive member 310, while the light guide member 320 in FIG. 3 is a cylindrical mirror, and the cylindrical mirror 320 reflects the received light beam and guides it to the photosensitive member 310.

FIG. 4 illustrates a schematic diagram of yet another embodiment 400 of an optical detecting assembly in accordance with the present invention. The optical detecting assembly 400 in accordance with the present invention includes a photosensitive element 410 configured to receive an optical signal and convert it into an electrical signal. Further, the optical detecting assembly 400 in accordance with the present invention includes a light guide member, wherein the light guide member includes a first portion for receiving a light beam and guiding the light beam to the photosensitive element 410 and a second portion for receiving a light beam and guiding the light beam to the photosensitive element 410. As can be seen from the figure, the difference between the optical detecting assembly 400 according to the embodiment illustrated in FIG. 4 and the optical detecting assemblies 200 and 300 of the embodiment illustrated in FIGS. 2 and 3 is that the structure and shape of the light guide members included in the optical detecting assembly 400 are different from that of the light guide members 220 and 320 included in the optical detecting assemblies 200 and 300 thereof, and the light guide member 220 in FIG. 2 is a semi-cylindrical lens, the light guide member 320 is a cylindrical mirror, while the light guide member shown in FIG. 4 is a light guide rod or an optical fiber. In the embodiment shown in FIG. 4, there are six light guide rods or optical fibers, namely light guide rods or optical fibers 421, 422, 423, 424, 425, and 426. More particularly, the first portion and the second portion of the light guide member may be symmetrically disposed with several guide portions of light guide rods or guide heads of the optical fibers 4211, 4212; 4221, 4222; 4231, 4232; 4241, 4242; 4251; 4252 and 4261, 4262. When the light beam is traveling through them, the light beam is guided and transmitted to the corresponding photosensitive element 410 by guide portions of light guide rods or guide heads of the optical fibers. Those skilled in the art will appreciate that the six light guide rods or optical fibers shown herein are merely illustrative and not limiting, and of course, the optical detecting assembly shown in accordance with the present invention may include more or less than six light guide rods or optical fibers.

It can be seen from the above embodiments that an element which can be used as a light guide member in the concept of the present invention can be configured, for example, as a spherical mirror, a free-form surface mirror, an aspherical mirror, a light guide bar, a light guide surface, a plane mirror, a light guide rod, a fiber or a reflecting mirror, etc.

Furthermore, a second aspect of the present invention provides a detector for use with a laser emitting apparatus, wherein the detector includes the optical detecting assembly in accordance with the first aspect of the present invention. According to the second aspect, the optical detecting assembly in accordance with the present invention can be in the detector for use with a laser emitting apparatus, thereby enabling measurement of the distance between the laser emitting apparatus and the detector.

Moreover, a third aspect of the invention provides a laser ranging system comprising a laser emitting apparatus and a detector in accordance with the second aspect of the present invention. According to the third aspect, the detector in accordance with the present invention can be combined with a laser emitting apparatus to form a laser ranging system, thereby enabling measurement of the distance between the laser emitting apparatus and the detector.

Figure 5:
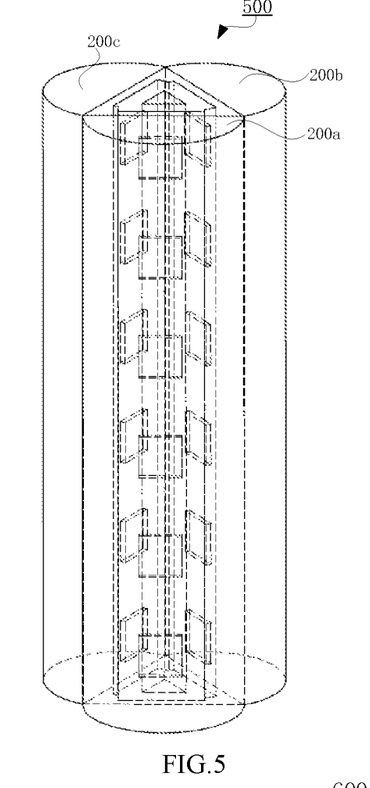
FIG. 5 illustrates a schematic diagram of a detector 500 according to an embodiment of the present invention.

FIG. 5 illustrates a schematic diagram of a detector 500 in accordance with one embodiment of the present invention. As can be seen from the figure, the detector 500 includes three sets of optical detecting assemblies 200a, 200b, and 200c as shown in FIG. 2, and the three sets of optical detecting assemblies 200a, 200b, and 200c are disposed by 120 degrees differing from one another, one skilled person will appreciate that various sets of optical detecting assemblies of other quantities and angles are also feasible, such as the optical detecting assemblies shown in FIGS. 3 and 4, which can also be disposed correspondingly to form the detector 500 of the inventive concept as shown in FIG. 5. Such a detector 500 can, when in use, receive laser light emitted by a laser emitting apparatus such as a laser leveling device that is associated therewith independent of the orientation of the detector 500. After receiving the laser light emitted by the laser emitting apparatus, the horizontal plane indicated by the laser light of the laser emitting apparatus can be found, and the distance between the laser emitting apparatus and the detector 500 can be calculated accordingly. It should be understood by those skilled in the art that the three sets illustrated are merely illustrative and not limiting, that is, two, four or more sets of optical detection members are also feasible, at least these sets of optical detection members are circumferentially arranged, so as to receive the laser light emitted by the laser emitting apparatus without a dead angle.

Figure 6:
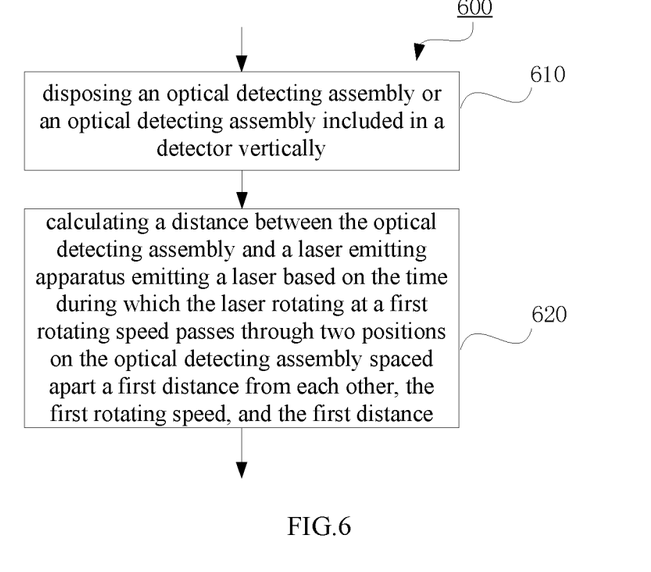
FIG. 6 illustrates a flow chart of a laser ranging method 600 according to an embodiment of the present invention.

The distance calculation and the method of finding the horizontal plane indicated by the laser are further described below in conjunction with FIG. 6. FIG. 6 illustrates a flow chart of a laser ranging method 600 in accordance with one embodiment of the present invention. As can be seen from FIG. 6, the method at least comprises the following two steps, namely first in the method step 610, disposing the optical detecting assembly 200 or the optical detecting assemblies 200a, 200b, 200c included in the detector 500 described above vertically; and then, in the next method step 620, calculating a distance D between the optical detecting assembly 200/200a/200b/200c and a laser emitting apparatus emitting a laser based on the time $\Delta t$ during which the laser rotating at a first rotating speed s passes through two positions on the optical detecting assembly 200/200a/200b/200c spaced apart a first distance L from each other, the first rotating speed (which can calculate the time T of one rotation), and the first distance, in particular, $D=L/2/\tan(\Delta t/T*180°)$. Furthermore, the method further comprises dividing the photosensitive elements of the optical detecting assembly into a first sub-group located on the upper half and a second sub-group located on the lower half; and adjusting the position of the optical detecting assembly according to the energy distribution of the laser rotating at the first rotating speed on the first sub-group and the second sub-group to determine a horizontal plane indicated by the laser rotating at the first rotating speed.

In summary, the optical detecting assembly in accordance with the present invention can implement the process of optical signals at different positions using only one set of photosensitive members by providing the light guide member, thereby advantageously simplifying the structure of the optical detecting assembly in the prior art, and correspondingly reducing the manufacturing cost of the optical detecting assembly in the prior art. When the optical detecting assembly is used in the detector, the distance between the laser emitting apparatus and the detector can be measured.

It will be understood by those skilled in the art that various changes and modifications may be made without departing from the spirit of the invention. Therefore, the scope of the invention should be defined by the appended claims.

Although various exemplary embodiments of the present invention have been described, it is obvious to those skilled in the art that various changes and modifications can be made, and one or some of the advantages of the present invention can be achieved without departing from the spirit and scope of the invention. Other components performing the same function may be appropriately replaced for those skilled in the art. It should be appreciated that features that are explained herein with reference to particular figures may be combined with features of other figures, even in those instances which have not explicitly mentioned this. Moreover, the method of the present invention can be implemented in either a software implementation using appropriate processor instructions or in a hybrid implementation that utilizes a combination of hardware logic and software logic to achieve the same results. Such modifications to the aspects in accordance with the present invention are intended to be covered by the appended claims.

What is claimed is:

1. An optical detecting assembly, wherein the optical detecting assembly comprises:
   a photosensitive element configured to receive an optical signal and convert the optical signal into an electrical signal; and
   a light guide member configured to receive light beams from a rotating light source and guide the light beams to the photosensitive element, the light guide member being a single piece of equipment and comprising a first portion and a second portion,
   wherein the first portion of the light guide member is configured to receive a first light beam from the rotating light source at a first time point and guide the first light beam to the photosensitive element, and the second portion of the light guide member is configured to receive a second light beam from the rotating light source at a second time point and guide the second light beam to the photosensitive element, and
   a distance between the optical detecting assembly and the rotating light source is calculated based on a distance between the first portion and the second portion, a time difference between the first time point and the second time point, and a rotating speed of the rotating light source.

2. The optical detecting assembly of claim 1, wherein the optical detecting assembly further comprises:
   a signal processing module configured to process the electrical signal.

3. The optical detecting assembly of claim 2, wherein the optical detecting assembly further comprises:
   an amplifying circuit coupled between the photosensitive element and the signal processing module and configured to amplify the electrical signal originating from the photosensitive element and output the amplified electrical signal to the signal processing module.

4. The optical detecting assembly of claim 2, wherein the optical detecting assembly further comprises:
   a filter circuit coupled between the photosensitive element and the signal processing module and configured to filter the electrical signal originating from the photosensitive element.

5. The optical detecting assembly of claim 1, wherein the first portion and the second portion are configured to be located at two positions opposite to each other on the light guide member.

6. The optical detecting assembly of claim 5, wherein the distance between the first portion and the second portion is set to a first distance.

7. The optical detecting assembly of claim 1, wherein the photosensitive element is configured as a photoelectric sensing device.

8. The optical detecting assembly of claim 1, wherein the optical detecting assembly further comprises a timing module configured to calculate the time during which the light beam is sensed respectively by the first portion and the second portion.

9. The optical detecting assembly of claim 1, wherein the light guide member is configured as a single spherical mirror, a single free-form mirror, a single aspheric mirror, a light guide bar, a single light guide surface, a single plane mirror, a single fiber or a single reflecting mirror.

10. The optical detecting assembly according to claim 1, wherein:
    the light guide member is a solid semi-cylindrical lens; and
    the photosensitive element is disposed on a back of a flat side of the solid semi-cylindrical lens.

11. The optical detecting assembly according to claim 1, wherein:
    the light guide member is a semi-cylindrical-shell-shaped mirror; and
    the photosensitive element is surrounded by the semi-cylindrical-shell-shaped mirror.

12. A detector for use with a laser emitting apparatus having a rotating light source, wherein the detector comprises an optical detecting assembly, the optical detecting assembly comprising:
    a photosensitive element configured to receive an optical signal and convert the optical signal into an electrical signal; and
    a light guide member configured to receive light beams from the rotating light source and guide the light beams to the photosensitive element, the light guide member being a single piece of equipment and comprising a first portion and a second portion,
    wherein the first portion of the light guide member is configured to receive a first light beam from the rotating light source at a first time point and guide the first light beam to the photosensitive element, and the second portion of the light guide member is configured to receive a second light beam from the rotating light source at a second time point and guide the second light beam to the photosensitive element, and a distance between the optical detecting assembly and the rotating light source is calculated based on a distance between the first portion and the second portion, a time difference between the first time point and the second time point, and a rotating speed of the rotating light source.

13. The detector of claim 12, wherein the number of optical detecting assemblies is at least two sets, and the at least two sets of optical detecting assemblies are circumferentially arranged.

14. A laser ranging system, wherein the laser ranging system comprises the laser emitting apparatus and the detector according to claim 12.

15. A laser ranging method, comprising:
   disposing an optical detecting assembly, the optical detecting assembly comprising:
      a photosensitive element configured to receive an optical signal and convert the optical signal into an electrical signal; and
      a light guide member configured to receive light beams from the rotating light source and guide the light beams to the photosensitive element, the light guide member being a single piece of equipment and comprising a first portion and a second portion,
      wherein the first portion of the light guide member is configured to receive a first light beam from the rotating light source at a first time point and guide the first light beam to the photosensitive element, and the second portion of the light guide member is configured to receive a second light beam from the rotating light source at a second time point and guide the second light beam to the photosensitive element;
   calculating a distance between the optical detecting assembly and the rotating light source based on a distance between the first portion and the second portion, a time difference between the first time point and the second time point, and a rotating speed of the rotating light source.

16. The method of claim 15, wherein the rotating light source is a laser and the method further comprises:
   dividing the photosensitive elements of the optical detecting assembly into a first sub-group located on the upper half and a second sub-group located on the lower half; and
   adjusting a position of the optical detecting assembly according to an energy distribution of the laser rotating at the rotating speed on the first sub-group and the second sub-group to determine a horizontal plane indicated by the laser rotating at the rotating speed.

* * * * *